(12) United States Patent
Ito et al.

(10) Patent No.: US 8,940,431 B2
(45) Date of Patent: Jan. 27, 2015

(54) BATTERY AND CURRENT COLLECTOR

(75) Inventors: Syun Ito, Kyoto (JP); Shogo Waki, Kyoto (JP)

(73) Assignee: GS Yuasa International Ltd., Kyoto-Shi, Kyoto (JP)

( * ) Notice: Subject to any disclaimer, the term of this patent is extended or adjusted under 35 U.S.C. 154(b) by 156 days.

(21) Appl. No.: 13/316,234

(22) Filed: Dec. 9, 2011

(65) Prior Publication Data

US 2012/0148909 A1   Jun. 14, 2012

(30) Foreign Application Priority Data

Dec. 10, 2010   (JP) ................................. 2010-276202
Nov. 4, 2011    (JP) ................................. 2011-242566

(51) Int. Cl.
| H01M 2/30 | (2006.01) |
| H01M 2/22 | (2006.01) |
| H01M 2/04 | (2006.01) |
| H01M 2/06 | (2006.01) |

(52) U.S. Cl.
CPC ................ *H01M 2/22* (2013.01); *H01M 2/043* (2013.01); *H01M 2/06* (2013.01)
USPC ............ 429/178; 429/179; 429/160; 429/161

(58) Field of Classification Search
USPC ................................... 429/178, 179, 160, 161
See application file for complete search history.

(56) References Cited

U.S. PATENT DOCUMENTS

| 6,013,389 | A  | * | 1/2000 | Nakamaru et al. ............ 429/161 |
| 6,444,348 | B1 |   | 9/2002 | Saijo et al. |
| 6,534,212 | B1 | * | 3/2003 | Hooke ............................. 429/94 |
| 6,579,640 | B1 |   | 6/2003 | Nagase et al. |
| 2003/0104276 | A1 |   | 6/2003 | Mizuno et al. |
| 2008/0038627 | A1 |   | 2/2008 | Yamauchi et al. |
| 2010/0143786 | A1 |   | 6/2010 | Kim |
| 2010/0216008 | A1 |   | 8/2010 | Yoon |
| 2012/0196179 | A1 | * | 8/2012 | Suzuki et al. ................. 429/179 |

FOREIGN PATENT DOCUMENTS

| JP | 2001-93486 A   | 4/2001 |
| JP | 2003-173767 A  | 6/2003 |
| JP | 2008-66254 A   | 3/2008 |
| JP | 2009-277603 A  | 11/2009 |
| JP | 2010-212111 A  | 9/2010 |
| JP | 2011-81949 A   | 4/2011 |

OTHER PUBLICATIONS

United States Office Action dated Mar. 5, 2014 in U.S. Appl. No. 13/361,883.
United States Office Action dated Mar. 21, 2014 in U.S. Appl. No. 13/316,226.
Japanese Office Action dated May 7, 2014.

* cited by examiner

*Primary Examiner* — Mark F Huff
*Assistant Examiner* — Olatunji Godo
(74) *Attorney, Agent, or Firm* — McGinn IP Law Group, PLLC

(57) ABSTRACT

A negative current collector includes a base, which is fixed to a cover of a battery and is electrically connected to a negative external terminal, and a leg which projects from the base and is electrically connected to a negative electrode in a power generating element. There is provided a rib projecting in the same orientation as that of the leg along at least a part of the outer peripheral edge of the base.

20 Claims, 11 Drawing Sheets

BATTERY AND CURRENT COLLECTOR

BACKGROUND OF THE INVENTION

1. Field of the Invention

The present invention relates to a battery and a current collector.

2. Description of the Related Art

A battery such as a nonaqueous electrolytic secondary battery includes a positive current collector and a negative current collector for electrically connecting a positive electrode and a negative electrode in a power generating element to a positive external terminal and a negative external terminal, respectively. The current collectors are fixed to a cover in the battery by means such as caulking using, for example, a rivet (see, for example, Japanese Unexamined Patent Application Publication No. 2010-212111).

Particularly, in a nonaqueous electrolytic secondary battery for a vehicle such as an electric car, a current collector requires vibration resistance and shock resistance for a long period of time. However, consideration and study have not been sufficiently given to vibration resistance and shock resistance of a current collector in a conventional battery. Therefore, when the conventional battery is used for a long period of time in environment in which a vibration or a shock is exerted, an increase in electric resistance is unfavorably caused by insufficient vibration resistance or shock resistance of the current collector.

SUMMARY OF THE INVENTION

An object of the present invention is to enhance vibration resistance and shock resistance of a current collector in a battery so as to prevent an increase in electric resistance.

A battery according to a first aspect of the present invention includes a current collector which electrically connects a power generating element contained inside of an envelope to an external terminal whose at least part is disposed outside of the envelope, wherein the current collector comprises: a base electrically connected to the external terminal; a connector projecting from the base to be electrically connected to the power generating element; and a rib disposed in the base.

Specifically, the rib is disposed along at least a part of an outer peripheral edge of the base.

Preferably, the rib is formed by drawing the base.

when the rib is formed by drawing, work hardening is caused around the base in the current collector, in particular, the rib, thereby locally increasing a yield stress. Thus, it is possible to suppress plastic deformation of the base in the current collector. Consequently, the vibration resistance and the shock resistance of the current collector can be further enhanced by drawing the rib.

More specifically, the rib includes a main portion projecting from the base in the same orientation as that of the connector.

The rib including the main portion enhances a section modulus or a polar section modulus of the base of the current collector, thus increasing the strength of the base of the current collector with respect to flexure or torsion caused by a vibration or a shock. As a consequence, the vibration resistance and the shock resistance of the current collector can be enhanced, thereby preventing an increase in electric resistance.

It is preferable that the rib further includes an extension projecting from the tip end of the main portion.

The section modulus or the polar section modulus of the base in the current collector can be further increased by disposing the extension at the tip end of the main portion, and therefore, the strength of the base in the current collector can be further increased against flexure or torsion caused by a vibration or a shock. Consequently, the vibration resistance and the shock resistance of the current collector can be further enhanced, and thus, an increase in electric resistance can be further securely prevented.

Preferably, the envelope includes a cover having a recess formed at the inside surface thereof; and the base of the current collector is disposed in the recess.

In this case, since the whole of the base is disposed in the recess, even if the base has a flat-plate shape, it is possible to enlarge the volume in the battery and easily carry out the positioning of the current collector when fabricating the battery.

Preferably, the envelope includes a cover having a recess formed at the inside surface thereof; and the base of the current collector includes: a first portion contained inside of the recess; a second portion contained in the inside surface of the cover adjacent to the recess and having the connector; and a joint which stepwise joins the first portion and the second portion to each other.

As the base of the current collector includes the first portion and the second portion which are joined via the joint such that the first portion and the second portion are formed not into a mere flat plate but stepwise, so that the strength of the base of the current collector can be further increased against flexure or torsion caused by a vibration or a shock. As a consequence, the vibration resistance and the shock resistance of the current collector can be further enhanced, thus securely preventing an increase in electric resistance. Moreover, as the first portion in the stepwise base is disposed in the recess of the cover whereas the second portion is disposed at the lower surface of the cover, the current collector can be more firmly fixed to the cover in the battery. In this regard, the vibration resistance and the shock resistance of the current collector can be enhanced. In this manner, the vibration resistance and the shock resistance can be further enhanced, thus further securely preventing an increase in electric resistance.

In this case, the main portion of the rib is preferably disposed at the outer peripheral edge of the first portion of the base except the portion joined to the joint. The first portion of the base in the current collector is formed into a shallow tray. This shape also can enhance the strength of the base against flexure or torsion caused by a vibration or a shock.

Particularly, the connector is connected to the extension of the rib. In this case, the main portion of the rib is further disposed at the second portion of the base, the extension of the rib is disposed at the first portion on the second portion side and the second portion in the base. With this configuration, as the length of the connecting portion between the connector and the base in the current collector is increased, the rigidity of the current collector as a whole is enhanced. Consequently, the strength can be further increased against flexure or torsion caused by a vibration or a shock.

A current collector according to a second aspect of the present invention, for electrically connecting a power generating element contained inside of an envelope of a battery and an external terminal whose at least part is disposed outside of the envelope, includes: a base connected to the external terminal; a connector projecting from the base to be joined to the power generating element; and a rib disposed in the base.

DETAILED DESCRIPTION OF THE PREFERRED EMBODIMENT

A detailed description will be given below of a embodiment according to the present invention with reference to the attached drawings.

(First Embodiment)

Figure 1:
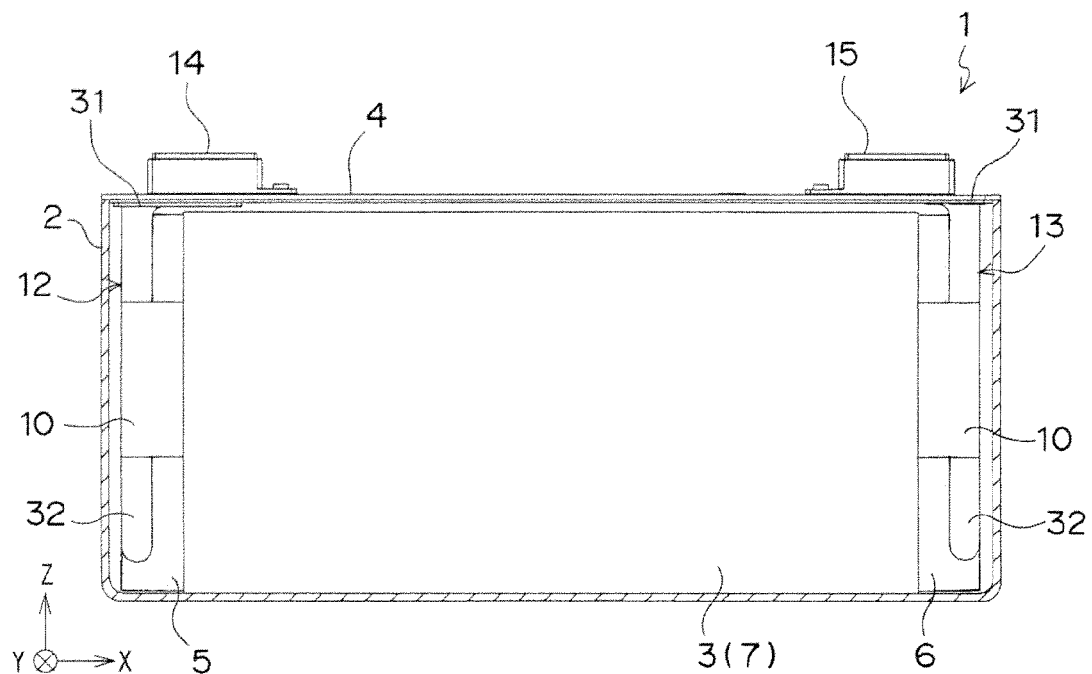
FIG. 1 is a partly cross-sectional front view of a battery in a first embodiment according to the present invention.

FIG. 1 shows a nonaqueous electrolytic secondary battery 1 (hereinafter simply referred to as a battery) in a first embodiment according to the present invention. In the battery 1, a power generating element 3 is housed inside of a battery case 2 which is made of aluminum or an aluminum alloy and is formed into a rectangular parallelepiped shape, and further, an upper opening of the battery case 2 is sealed by a cover 4. The battery case 2 and the cover 4 constitute an envelope. The upper surfaces of a negative external terminal 14 and a positive external terminal 15 are exposed to the outside of the cover 4.

The power generating element 3 includes a negative electrode 5 formed of a copper foil, a positive electrode 6 formed of an aluminum foil, and a separator 7 formed of a porous resin film and interposed between the negative electrode 5 and the positive electrode 6. All of these members are formed into a belt shape, and the negative electrode 5 and the positive electrode 6 are flatly wound in the state in which the negative electrode 5 and the positive electrode 6 are displaced with respect to the separator 7 oppositely in a widthwise direction. In the power generating element 3, the negative electrode 5 is electrically connected to the negative external terminal 14 via a negative current collector 12 whereas the positive electrode 6 is electrically connected to the positive external terminal 15 via a positive current collector 13.

Figure 2:
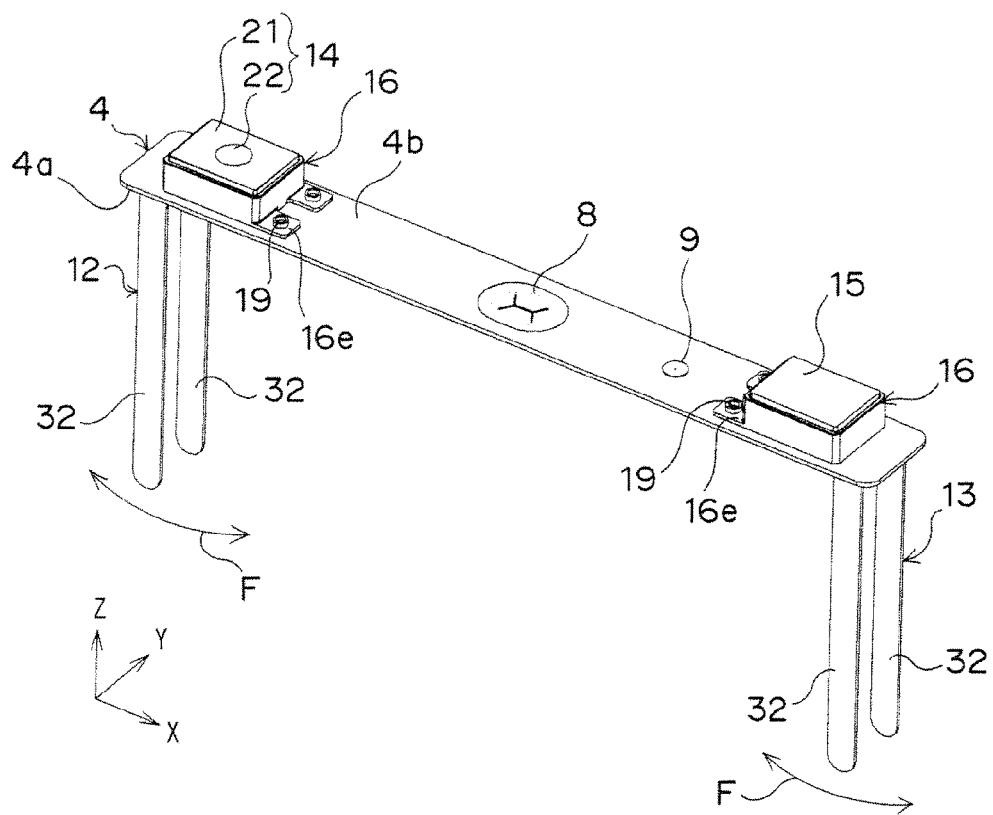
FIG. 2 is a perspective view of a cover of FIG. 1, as viewed from above.
Figure 3:
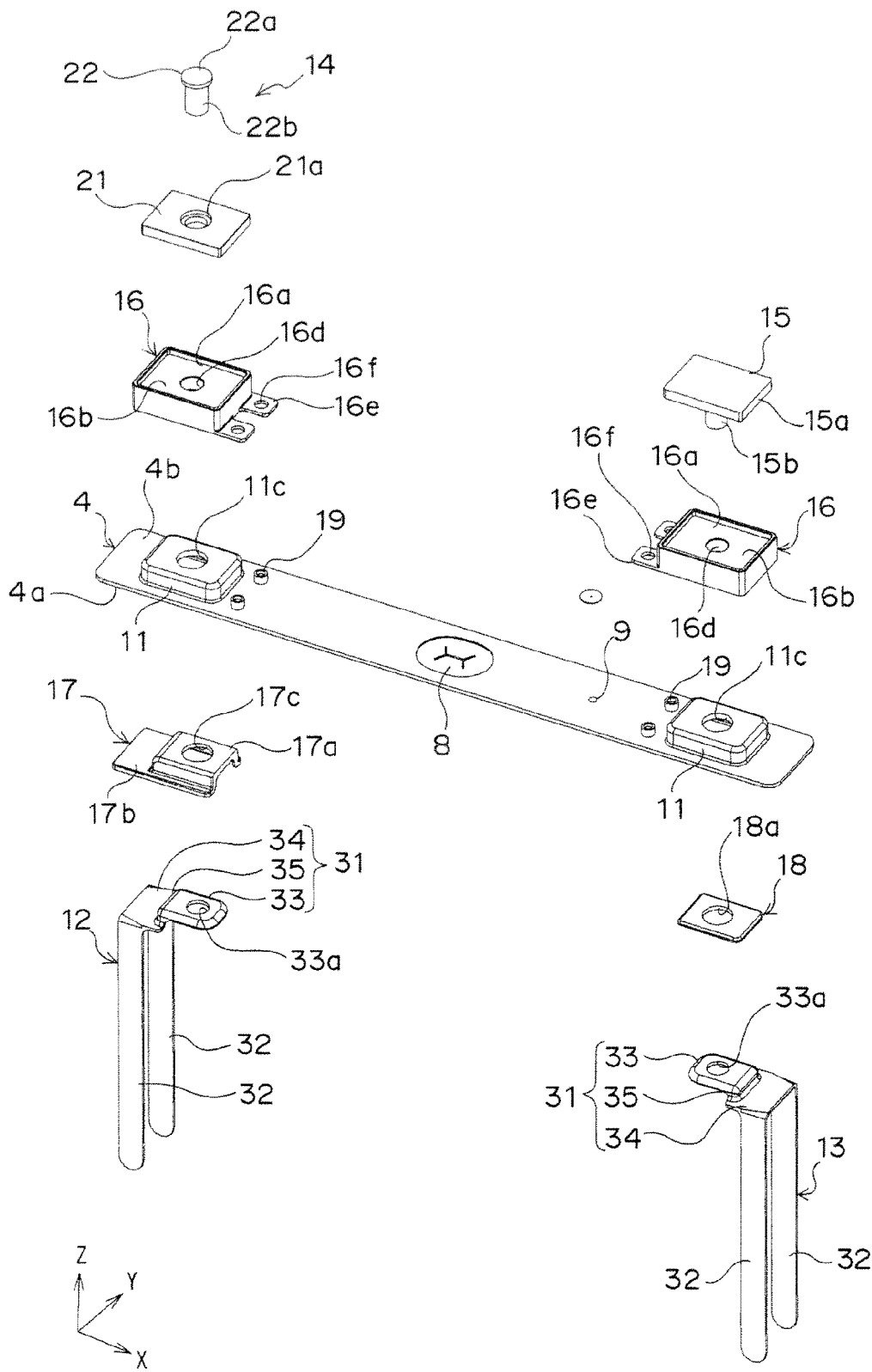
FIG. 3 is an exploded perspective view of the cover of FIG. 2.
Figure 4:
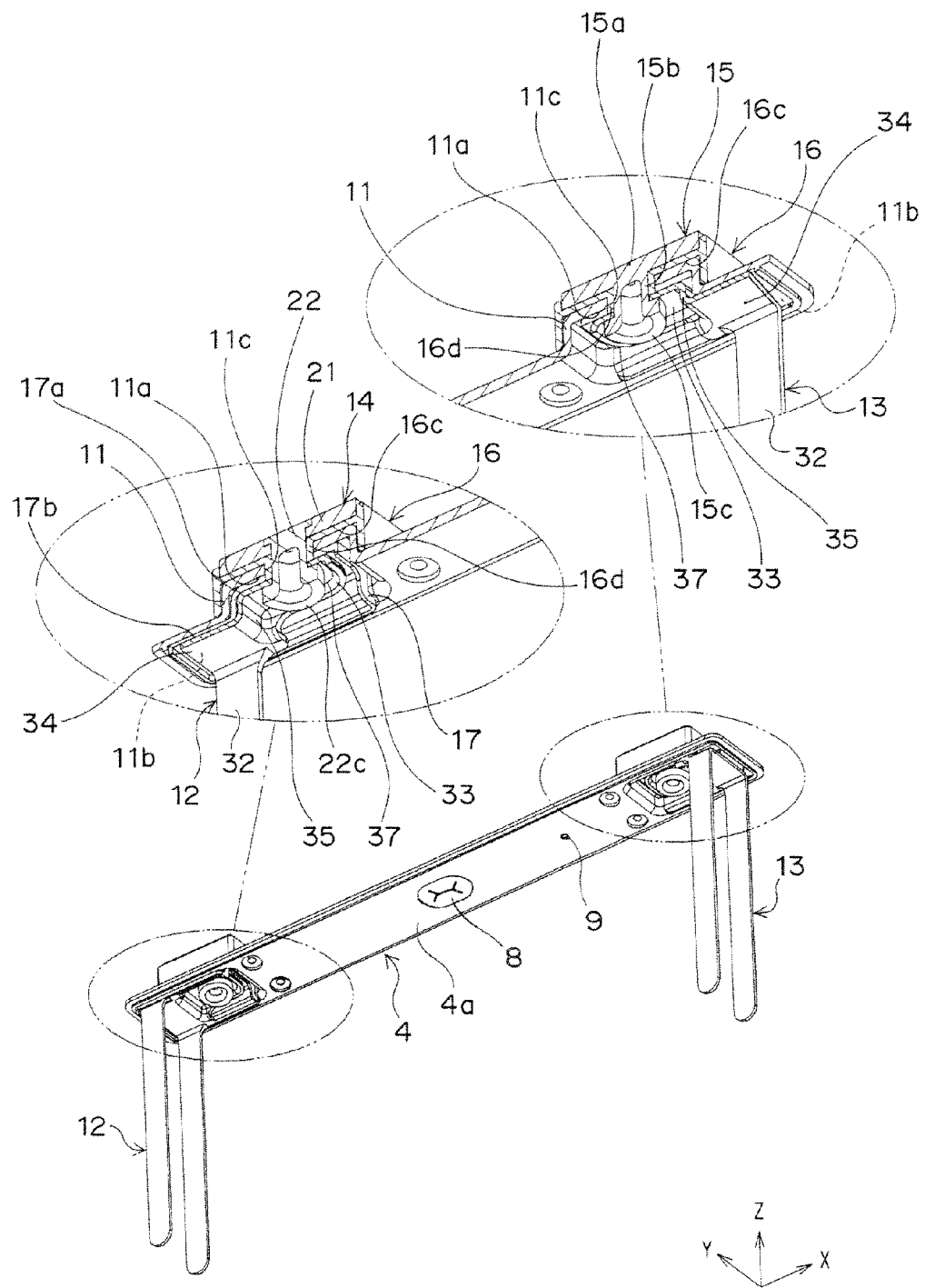
FIG. 4 is a perspective view of the cover of FIG. 1, as viewed from below.

Referring to FIGS. 2 to 4 together, the cover 4 is made of an elongated metallic plate formed into a rectangular shape, as viewed on plane. The cover 4 includes a safe valve 8 near the center thereof in a longitudinal direction and a liquid injection hole 9 formed at one end thereof.

An engagement receiving portion 11 formed into a substantially rectangular shape, as viewed on plane, is formed at both ends of the cover 4 so as to expand upward from an upper surface 4b. The engagement receiving portion 11 has an engagement recess 11a formed by depressing a lower surface 4a of the cover 4. Moreover, a shallow guide recess 11b is formed around the engagement recess 11a except one side at the lower surface 4a of the cover 4. Additionally, a through hole 11c is formed at the center of a ceiling constituting the engagement recess 11a.

In FIGS. 2 to 4, the negative external terminal 14 and the negative current collector 12 are fitted to the engagement receiving portion 11 and the guide recess 11b on the left via an upper gasket 16 and a negative lower gasket 17, respectively.

The upper gasket 16 is a resin part having a terminal holding recess 16b on the upper side and a mounting recess 16c on the lower side which are partitioned by a partition wall 16a. A cylindrical portion 16d extending downward and having openings at both ends thereof is formed at the center of the partition wall 16a. The upper gasket 16 is put on the engagement receiving portion 11 from above, and then, attached to the cover 4 by containing the engagement receiving portion 11 in the mounting recess 16c. The cylindrical portion 16d is inserted into the through hole 11c to intrude into the engagement recess 11a. Moreover, lock projections 19 projecting from the upper surface 4b of the cover 4 are inserted into lock holes 16f formed at two tongue pieces 16e provided in the upper gasket 16.

The negative lower gasket 17 includes an expanding portion 17a which is to be contained inside of the engagement recess 11a of the cover 4, and a flat portion 17b which is disposed continuously to the expanding portion 17a to be contained in the guide recess 11b of the engagement receiving portion 11. The expanding portion 17a is formed into a shape in conformity with the inner surface of the engagement recess 11a of the engagement receiving portion 11 except one side. Moreover, a through hole 17c is formed at the expanding portion 17a. The cylindrical portion 16d of the upper gasket 16 near the lower end thereof is inserted into the through hole 17c.

The negative external terminal 14 includes an aluminum plate-like member 21 having a rectangular shape, as viewed on plane, and a copper rivet 22. A flange 22a is press-fitted into a through hole 21a formed at the center of the plate-like member 21 so that the rivet 22 is fixed to the plate-like member 21 in the state in which a shaft 22b projects. The plate-like member 21 is contained in the terminal holding recess 16b of the upper gasket 16.

A base 31 of the negative current collector 12 is disposed in such a manner as to be fitted to the lower sides of the expanding portion 17a and the flat portion 17b of the negative lower gasket 17. The negative current collector 12 will be described later.

The shaft 22b of the rivet 22 in the negative external terminal 14 is inserted into the cylindrical portion 16d of the upper gasket 16 and the through hole 33a formed in the base 31 in the negative current collector 12, and then, the tip end is widened under pressure, thereby forming a large-diameter portion 22c. Consequently, the negative external terminal 14, the upper gasket 16, the negative lower gasket 17, and the base 31 of the negative current collector 12 are caulked and fixed to the cover 4.

In FIGS. 2 to 4, the positive external terminal 15 and the positive current collector 13 are fixed to the engagement receiving portion 11 and the guide recess 11b on the right side via the upper gasket 16 and a positive lower gasket 18, respectively.

In the same manner as the side of the negative electrode, the upper gasket 16 is attached to the engagement receiving portion 11. Moreover, the positive lower gasket 18 is formed into a plate having a through hole 18a, and is disposed inside of the engagement recess 11a.

The positive external terminal 15 is made of aluminum, and includes a plate-like member 15a formed into a rectangular shape, as viewed on plane, and a cylindrical shaft 15b projecting from the center of the lower surface of the member 15a. The plate-like member 15a is contained in a terminal holding recess 16b of the upper gasket 16.

A base 31 of the positive current collector 13 is disposed in such a manner as to be fitted to the lower side of the positive lower gasket 18. The positive current collector 13 will be described later.

The shaft 15b of the positive external terminal 15 is inserted into the cylindrical portion 16d of the upper gasket 16 and the through hole 33a formed at the base 31 of the positive current collector 13, and then, the tip end is widened under pressure, thereby forming a large-diameter portion 15c. Consequently, the positive external terminal 15, the upper gasket 16, the positive lower gasket 18, and the base 31 of the positive current collector 13 are caulked and fixed to the cover 4.

Figure 5A:
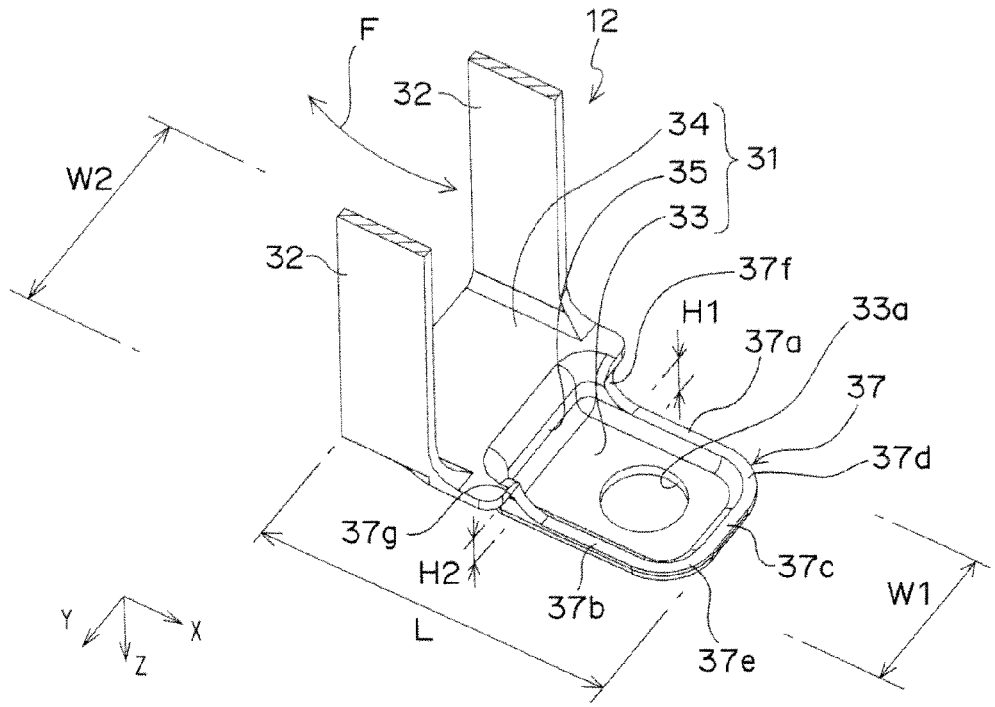
FIG. 5A is a partly enlarged perspective view of a negative current collector laid upside down in the first embodiment according to the present invention.
Figure 5B:
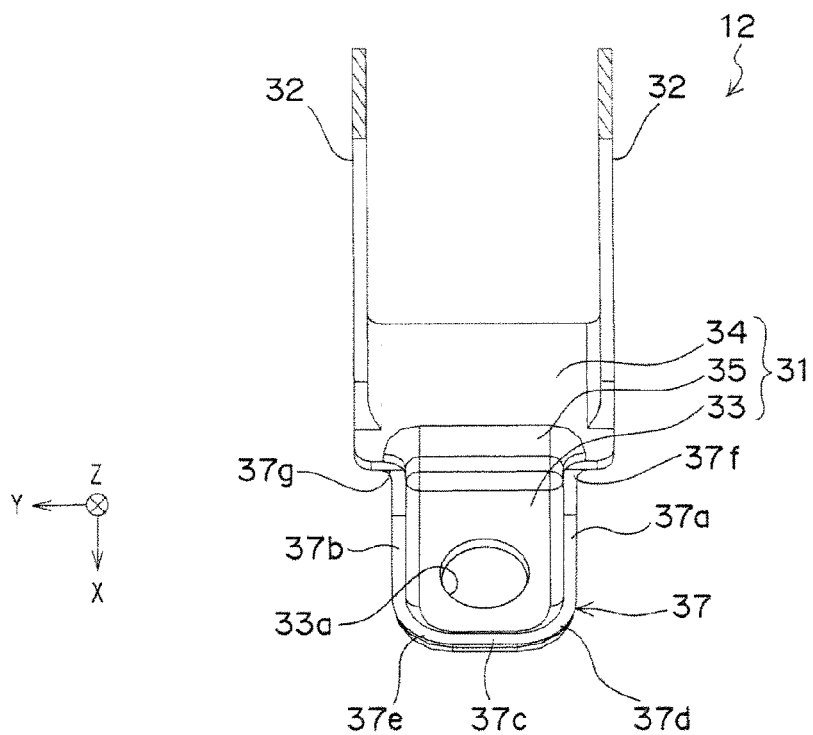
FIG. 5B is a partly enlarged perspective view of the negative current collector laid upside down in the first embodiment according to the present invention, as viewed in another direction.
Figure 6A:
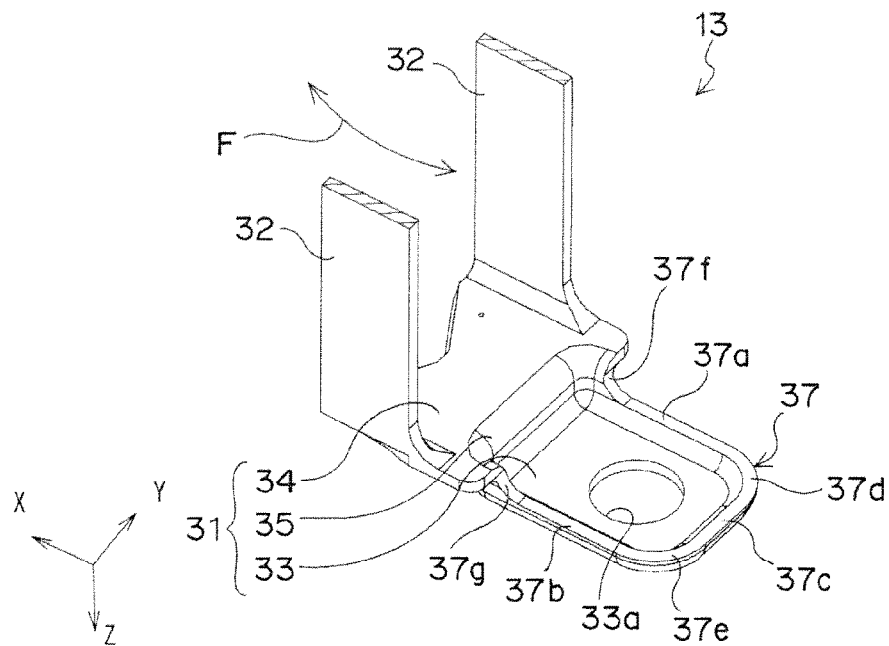
FIG. 6A is a partly enlarged perspective view of a positive current collector laid upside down in the first embodiment according to the present invention.
Figure 6B:
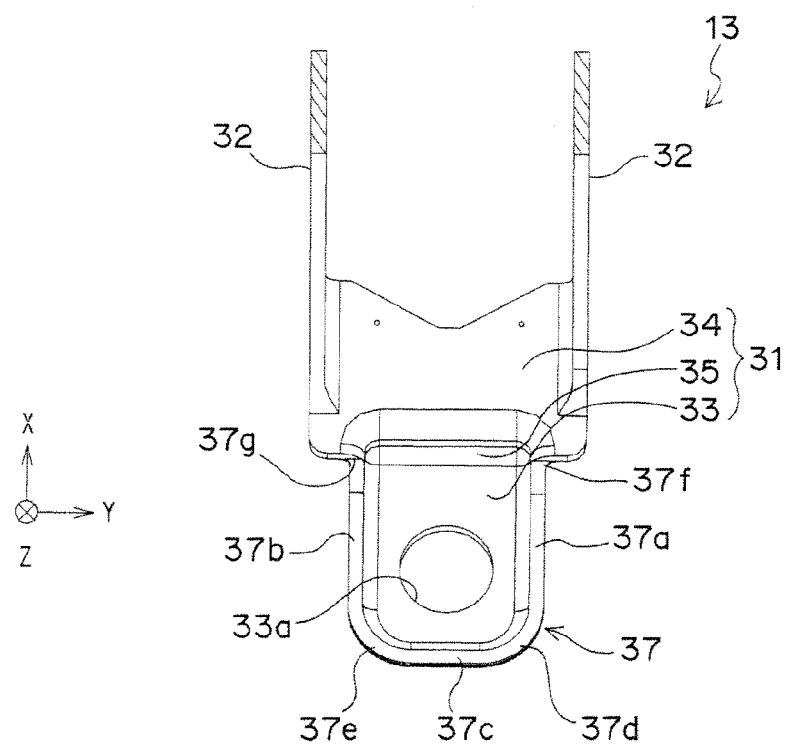
FIG. 6B is a partly enlarged perspective view of the positive current collector laid upside down in the first embodiment according to the present invention, as viewed in another direction.

The negative current collector 12 shown in FIGS. 5A and 5B is made of copper: in contrast, the positive current collector 13 shown in FIGS. 6A and 6B is made of aluminum. Both of the current collectors 12 and 13 are fabricated by pressing plates. The negative current collector 12 and the positive current collector 13 have the same structure, and therefore, a detailed description will be given only of the negative current collector 12. As for the positive current collector 13, the same or similar elements as or to those of the negative current collector 12 are designated by the same reference numerals. Only differences from the negative current collector 12 will be described below.

The negative current collector 12 shown in FIGS. 5A and 5B includes the base 31 and a pair of legs (i.e., connectors) 32 and 32. Also referring to FIG. 4, the base 31 includes a fixed portion (i.e., a first portion) 33, which is contained inside of the engagement recess 11a formed at the lower surface 4a of the cover 4 and disposed on the lower side of the expanding portion 17a in the negative lower gasket 17, and a mount (i.e., a second portion) 34 which is disposed on the lower side of the flat portion 17b of the negative lower gasket 17 at a position adjacent to the engagement recess 11a. When the battery 1 is installed in an attitude shown in FIG. 1, both of the fixed portion 33 and the mount 34 are arranged on a horizontal plane (i.e., an XY plane) whereas they are not positioned in the same height direction (i.e., a Z direction), that is, the fixed portion 33 and the mount 34 are stepwise positioned. Specifically, the fixed portion 33 contained inside of the engagement recess 11a of the cover 4 is positioned above the mount 34 disposed at the lower surface 4b of the cover 4. The fixed portion 33 and the mount 34 which are stepwise positioned are joined via a joint 35 which enlarges on a substantially vertical plane (i.e., a YZ plane) when the battery is installed in the attitude shown in FIG. 1.

A through hole 33a for allowing the shaft 22b of the rivet 22 in the negative external terminal 14 to be inserted therethrough is formed at the center of the fixed portion 33. As described above, the fixed portion 33 is caulked and fixed to the cover 4 via the rivet 22 together with the negative external terminal 14, the upper gasket 16, and the negative lower gasket 17. Moreover, the fixed portion 33 is electrically connected to a plate member 21 of the negative external terminal 14 via the rivet 22.

The mount 34 is formed into a substantially rectangular plate. The elongated rectangular legs 32 and 32 having a predetermined width project in parallel to each other from two sides opposite to each other (i.e., two sides opposite in a widthwise direction of the base 31) except one side on which the fixed portion 33 is joined via the joint 35 out of four sides of the mount 34. When the battery 1 is installed in the attitude shown in FIG. 1, the legs 32 and 32 extend from the mount 34 downward in a substantially vertical direction (i.e., a −Z direction), and thus, are disposed adjacently to the negative electrode 5 (i.e., the copper foil) of the power generating element 3. The legs 32 and 32 are electrically connected to and mechanically coupled to the negative electrode 5 in the power generating element 3 via a clip 10, schematically shown only in FIG. 1.

As most clearly shown in FIGS. 5A and 5B, a wall-like rib 37 is formed at the fixed portion 33 in the base 31 of the negative current collector 12. The rib 37 rises from the base 31 in such a manner as to project in a direction in which the legs 32 and 32 project and in a direction in which the joint 35 extends from the fixed portion 33 toward the mount 34. Specifically, the rib 37 includes linear portions 37a, 37b, and 37c along three sides except one side joined to the joint 35 out of four sides of the substantially rectangular fixed portion 33, an arcuate portion 37d connecting the linear portions 37a and 37c, and another arcuate portion 37e connecting the linear portions 37b and 37c. Moreover, the rib 37 includes round portions 37f and 37g rising from the ends of the linear portions 37a and 37b toward the mount 34, respectively. In other words, the rib 37 is formed along the outer peripheral edge of the base 31 except the side on the joint side to the joint 35.

Additionally, the height H1 of the rib 37 except the round portions 37f and 37g (i.e., a distance from the upper surface of the fixed portion 33 to the tip end of the rib 37 in FIG. 5A) is set to, for example, about 1 mm to about 10 mm under a condition such as the dimension of the base 31. Although the height H1 of the rib 37 except the round portions 37f and 37g is generally constant in the present embodiment, the rib 37 may be different in height at the positions.

Since the rib 37 is formed on the three sides and the joint 35 is joined to the residual one side, the fixed portion 33 exhibits a so-called shallow tray-like shape as a whole, and includes the caulking and fixing through hole 33a at the center thereof.

The fixed portion 33 and the mount 34 are stepwise positioned via the joint 35 by drawing a plate material, and further, the rib 37 is disposed along the outer peripheral edge of the fixed portion 33. In other words, the fixed portion 33 is formed into a shallow tray shape at the base 31 of the negative current collector 12 by drawing.

At the positive current collector 13, the fixed portion 33 is contained in the engagement recess 11a of the cover 4, to be stacked to the positive lower gasket 18. The mount 34 to be positioned adjacently to the engagement recess 11a is disposed at the lower surface 4a of the cover 4 without the positive lower gasket 18 (see FIG. 4). The legs 32 and 32 of the positive current collector 13 are electrically connected to and mechanically coupled to the positive electrode 6 in the power generating element 3 via the clip 10, schematically shown only in FIG. 1.

Upon the application of a vibration or a shock to the battery 1, force acts on the negative current collector 12 and the positive current collector 13 mainly in the X direction schematically indicated by an arrow F in FIGS. 2, 5A, and 6A. This is because the Y-directional displacement of the power generating element 3 inside of the battery case 2 is restricted at the inner surfaces on both side walls of the battery case 2 whereas in order to ensure a space used in connecting the negative current collector 12 and the positive current collector 13, there is a clearance in which the power generating element 3 may be displaced inside of the battery case 2 in the X direction. In the present embodiment, the formation of the rib 37 enhances a section modulus of the fixed portion 33 (which is securely caulked to the cover 4) at the base 31 provided in each of the negative current collector 12 and the positive current collector 13 against flexure indicated by the arrow F, thus improving the strength of the base 31 of each of the negative current collector 12 and the positive current collector 13.

Referring to FIG. 1 again, since there is a clearance for filling an electrolyte between the cover 4 and the power generating element 3, there is a clearance in which the power generating element 3 may be displaced inside of the battery case 2 not only in the X direction but also in the Z direction in the case where a vibration or a shock is exerted on the battery 1. Consequently, torsion force on substantially an X axis also is exerted on the fixed portion 33 of the base 31 of each of the negative current collector 12 and the positive current collector 13. In the present embodiment, the formation of the rib 37 enhances a polar section modulus of the fixed portion 33 at the base 31 provided in each of the negative current collector 12 and the positive current collector 13 against this kind of torsion, thus increasing the strength of the base 31 of each of the negative current collector 12 and the positive current collector 13.

As described above, the formation of the rib 37 enhances the section modulus or the polar section modulus at the base 31, thus increasing the strength of the base 31 of each of the negative current collector 12 and the positive current collector 13 against flexure or torsion caused by a vibration or a shock. As a consequence, the vibration resistance and the shock resistance of the negative current collector 12 and the positive current collector 13 can be enhanced. Moreover, since the vibration resistance and the shock resistance are enhanced, an increase in electric resistance can be prevented.

Additionally, as described above, the fixed portion 33 of the base 31 is formed into the shallow tray by the effect of the rib 37 and the joint 35. This shape contributes to increasing the strength of the base 31 against the flexure or the torsion caused by the vibration or the shock.

Forming of the rib 37 and forming of the structure in which the fixed portion 33 and the mount 34 are stepwise formed via the joint 35 are carried out by drawing the fixed portion 33 of the base 31. Since the rib 37 is formed by drawing, work hardening is generated around the base 31, in particular, the rib 37, and therefore, a yield stress is locally increased, thereby suppressing plastic deformation of the base 31 in each of the negative current collector 12 and the positive current collector 13. In other words, since the rib 37 is formed by drawing, the vibration resistance and the impact resistance of each of the negative current collector 12 and the positive current collector 13 are further enhanced, thus securely preventing an increase in electric resistance.

The base 31 is not formed into a mere flat plate but is structured such that the fixed portion 33 and the mount 34 are stepwise joined via the joint 35. Therefore, the base 31 in each of the negative current collector 12 and the positive current collector 13 is more resistant against flexure or torsion caused by a vibration or a shock, thereby contributing to the enhancement of the vibration resistance and the shock resistance of the negative current collector 12 and the positive current collector 13 and the prevention of an increase in electric resistance owing to the enhancement.

Moreover, in the stepwise base 31, as the fixed portion 33 is contained inside of the engagement recess 11a of the cover 4 and the mount 34 is disposed at the lower surface 4a of the cover 4, the negative current collector 12 and the positive current collector 13 can be more firmly fixed to the cover 4 in the battery 1. In this regard, the vibration resistance and the shock resistance can be enhanced, thereby preventing an increase in electric resistance.

(Second Embodiment)

Figure 7A:
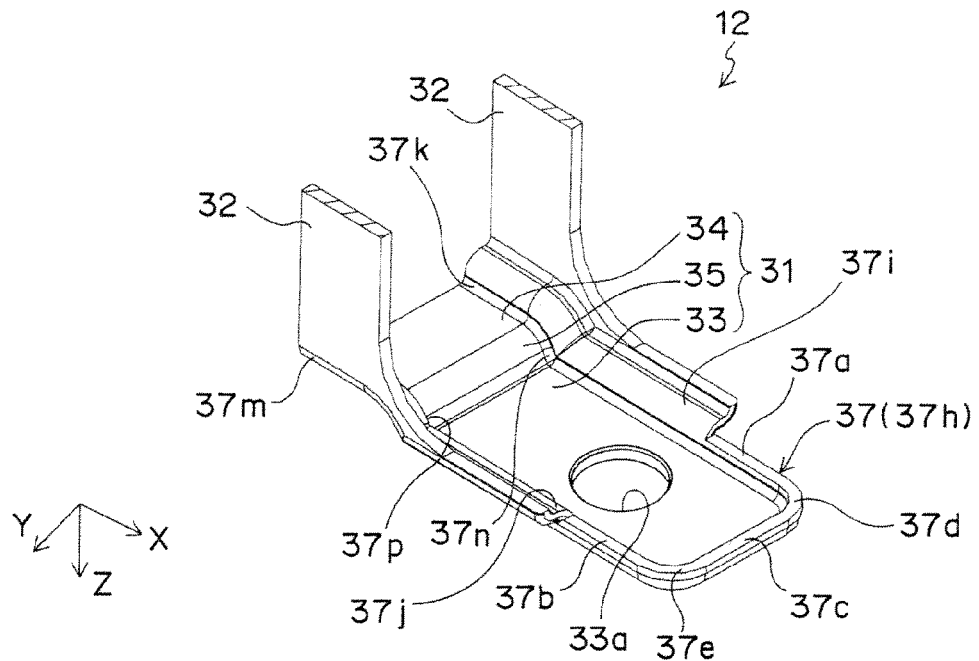
FIG. 7A is a partly enlarged perspective view of a negative current collector laid upside down in a second embodiment according to the present invention.
Figure 7B:
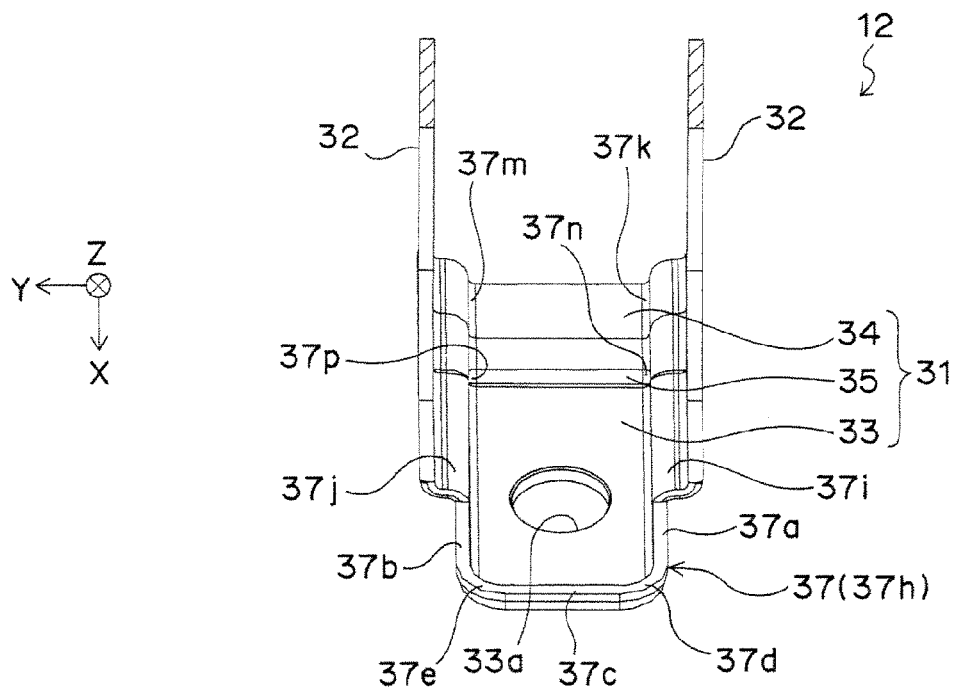
FIG. 7B is a partly enlarged perspective view of the negative current collector laid upside down in the second embodiment according to the present invention, as viewed in another direction.
Figure 7C:
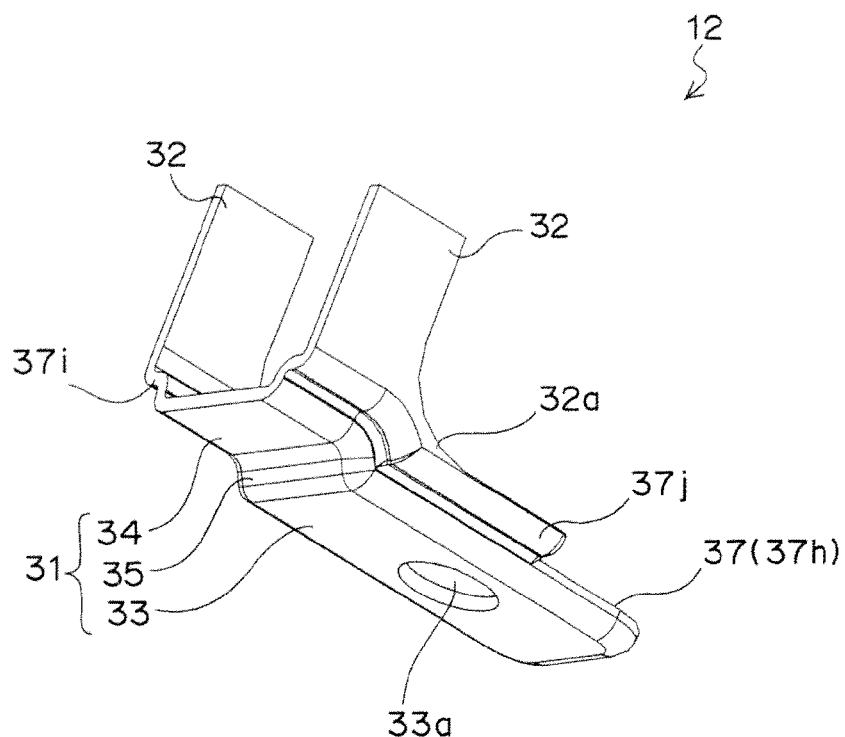
FIG. 7C is a partly enlarged perspective view of the negative current collector laid upside down in the second embodiment according to the present invention, as viewed in a further direction.
Figure 8A:
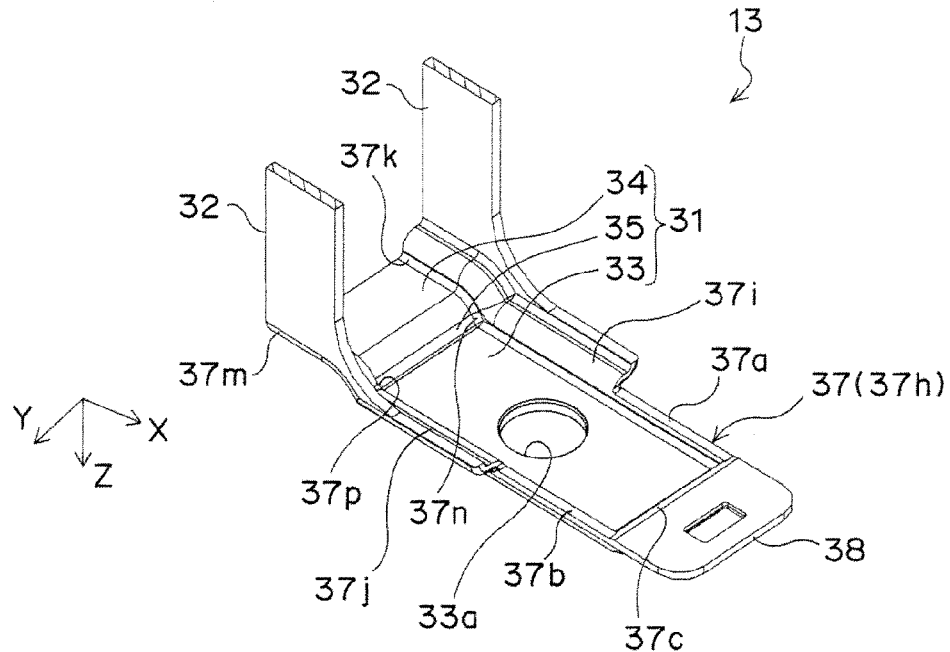
FIG. 8A is a partly enlarged perspective view of a positive current collector laid upside down in the second embodiment according to the present invention.
Figure 8B:
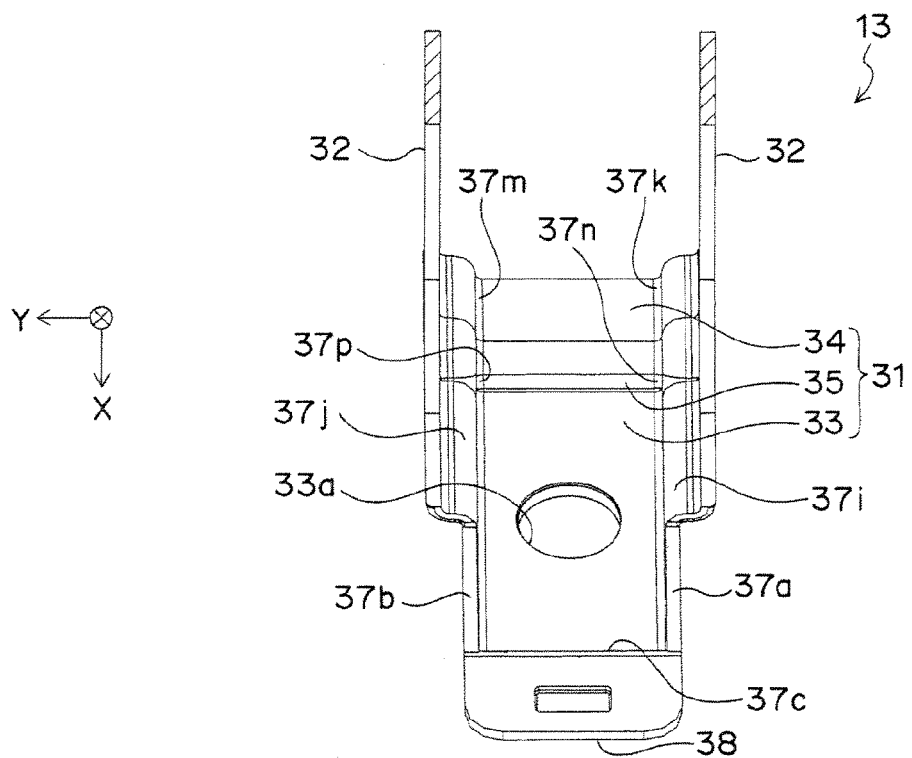
FIG. 8B is a partly enlarged perspective view of the positive current collector laid upside down in the second embodiment according to the present invention, as viewed in another direction.
Figure 8C:
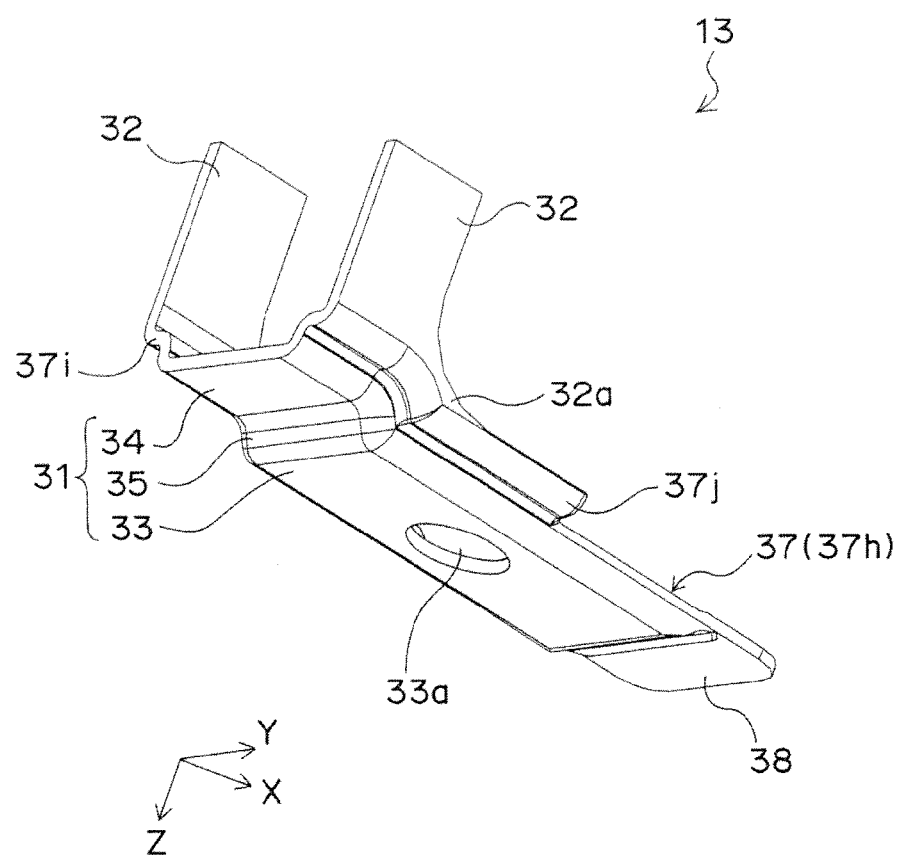
FIG. 8C is a partly enlarged perspective view of the positive current collector laid upside down in the second embodiment according to the present invention, as viewed in a further direction.

A second embodiment according to the present invention shown in FIGS. 7A to 8C is different from the first embodiment in the structure of a copper negative current collector 12 per se shown in FIGS. 7A to 7C and the structure of an aluminum positive current collector 13 per se shown in FIGS. 8A to 8C. The other structures of a battery 1 such as, in particular, a power generating element 3 for a negative and a positive current collector 12 and 13, a connection structure with respect to a negative and a positive external terminal 14 and 15, and a structure for fitting the negative and the positive current collector 12 and 13 to a cover 4 are the same as those in the first embodiment. Moreover, the negative current collector 12 and the positive current collector 13 have the same structure as each other in the present embodiment, and therefore, a detailed description will be given only of the negative current collector 12. In the positive current collector 13, the same or similar constituent elements are designated by the same reference numerals, and further, explanation will be made only on differences from the negative current collector 12.

In the negative current collector 12 shown in FIGS. 7A to 7C, a rib 37 includes a wall-like main portion 37h and a pair of extensions 37i and 37j projecting from the tip end of the main portion 37h outward laterally (in a Y direction in FIGS. 7A to 7C). Incidentally, the rib 37 of each of the negative and the positive current collector 12 and 13 in the first embodiment corresponds to a structure having only the main portion 37h of the rib 37 in the present embodiment.

The main portion 37h of the rib 37 is disposed along a fixed portion 33, a mount 34, and a joint 35 in the base 31 of the negative current collector 12. First, at the fixed portion 33 having a substantially rectangular shape, the main portion 37h of the rib 37 includes linear portions 37a, 37b, and 37c along three sides except one side joined to the joint 35 out of four sides, an arcuate portion 37d connecting the linear portions 37a and 37c, and another arcuate portion 37e connecting the linear portions 37a and 37c. Moreover, at the mount 34 formed into a substantially rectangular plate, the main portion 37h of the rib 37 includes linear portions 37k and 37m on two sides opposite to each other (i.e., two sides opposite to each other in a widthwise direction of the base 31) except one side on which the fixed portion 33 is joined via the joint 35. Furthermore, linear portions 37n and 37p are disposed on two sides opposite to each other at the joint 35 (i.e., two sides opposite to each other in a widthwise direction of the base 31) in such a manner as to join the linear portions 37a and 37b disposed at the fixed portion 33 to the linear portions 37k and 37m disposed at the mount 34.

In the present embodiment, not only the fixed portion 33 but also the mount 34 or the joint 35 can have a high section modulus or a high polar section modulus by disposing the wall-like main portion 37h also at the mount 34 and the joint 35. In this regard, the strength of the negative current collector 12 can be increased.

In the main portion 37h of the rib 37, the extensions 37i and 37j are disposed in the linear portions 37a and 37b disposed along the fixed portion 33 oppositely to each other, the other linear portions 37n and 37p disposed along the joint 35 continuously to the linear portions 37a and 37b, and the further other linear portions 37k and 37m disposed along the mount 34 continuously to the linear portions 37n and 37p. The extensions 37i and 37j are disposed at the linear portions 37a and 37b disposed along the fixed portion 33 oppositely to each other not in the entire length thereof but only in a range from the joint 35 to the center of a through hole 33a (on the side of the joint 35). In other words, the extensions 37i and 37j opposite to each other extend from the ends of the mount 34 to the middles of the fixed portion 33.

The section modulus or the polar section modulus of the base 31 in the negative current collector 12 can be further increased by disposing the extensions 37i and 37j at the tip ends of the main portion 37h of the rib 37, and therefore, the strength of the base 31 in the negative current collector 12 can be further increased against flexure or torsion caused by a vibration or a shock. As a consequence, the vibration resistance and the shock resistance of the negative current collector 12 can be further enhanced, thereby further securely preventing an increase in electric resistance.

A pair of legs 32 and 32 projects from the extensions 37i and 37j in the negative current collector 12, respectively. Specifically, these legs 32 and 32 are fixed to the extensions 37i and 37j via seats 32a at the lower end thereof. The seats 32a extend in substantially the entire length in a longitudinal direction of the extensions 37i and 37j. That is to say, portions at which the pair of legs 32 and 32 is connected to the base 31 extend on the way of the fixed portion 33 (the position corresponding to the center of the through hole 33a) beyond the seats 34. The rigidity of the negative current collector 12 can be enhanced as a whole by increasing the length of the seat 32a serving as a connecting portion between each of the legs 32 and 32 and the base 31, so that the strength against flexure or torsion caused by a vibration or a shock can be further increased.

The positive current collector 13 shown in FIGS. 8A to 8C is longer in the longitudinal direction of a fixed portion 33 than the negative current collector 12 shown in FIGS. 7A to 7C. Moreover, a tongue 38 extending from an upper end of a linear portion 37c of a rib 37 is disposed at a tip end of the fixed portion 33 in the longitudinal direction. The tongue 38 is adapted to weld the positive current collector 13 to the cover 4.

Experiments were carried out in order to confirm the effects of the present invention. In these experiments, the copper negative current collector 12 shown in FIGS. 5A and 5B was used (the experiments using the negative current collector 12 are hereinafter referred to as examples, as required). The dimensions of the negative current collector 12 in the examples were as follows. First, the total length L of the base 31 was 45 mm; the width W1 of the fixed portion 33 was 25 mm; and the width W2 of the mount 34 was 35 mm. Moreover, the height H1 of the rib 37 except the rounded portions 37f and 37g was 3 mm. Furthermore, the height H2 from the upper surface of the fixed portion 33 to the lower surface of the mount 34 in FIG. 5A was 7 mm. In contrast, a copper negative current collector 12' shown in FIG. 7 was prepared in comparative examples. The negative current collector 12' in the comparative examples had the same dimensions as those of the negative current collector 12 in the example except that a base 33' having a caulking through hole 33a' formed therein was formed into a flat plate without either a rib or a stepwise structure.

Figure 10:
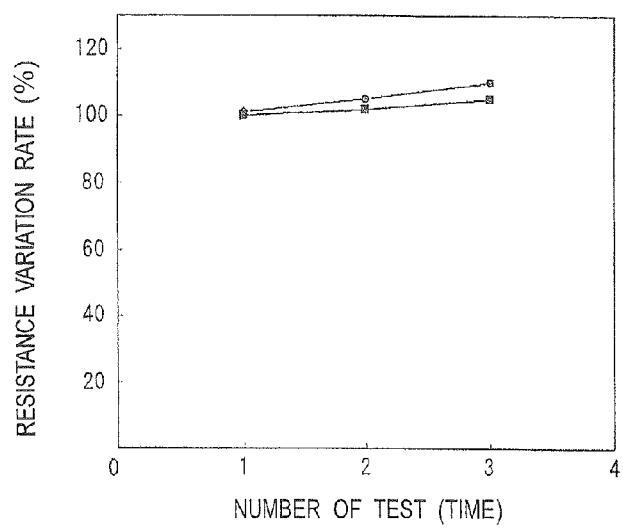
FIG. 10 is a graph illustrating the relationship between the number of tests and a resistance rate.

Tests with respect to vibration resistance and shock resistance were repeated three times under conditions defined by the UN Manual of Test and Criteria, to measure resistance rates of the battery. The test results are shown in Table 1 below and FIG. 10. In FIG. 10, circles show the comparative examples whereas squares show the examples.

TABLE 1

| | examples | comparative examples |
|---|---|---|
| first time | 100% | 100% |
| second time | 102% | 105% |
| third time | 105% | 110% |

As is obvious from Table 1 and FIG. 10, the resistance varied from 100% to 110% by an increase of 10% before and after the test in the comparative examples: in contrast, the resistance varied from 100% to 105% by an increase of 5% before and after the test in the examples. From this result, it is revealed that the vibration resistance and the shock resistance of the current collector can be enhanced according to the present invention, and therefore, the increase in electric resistance can be prevented.

Figure 9:
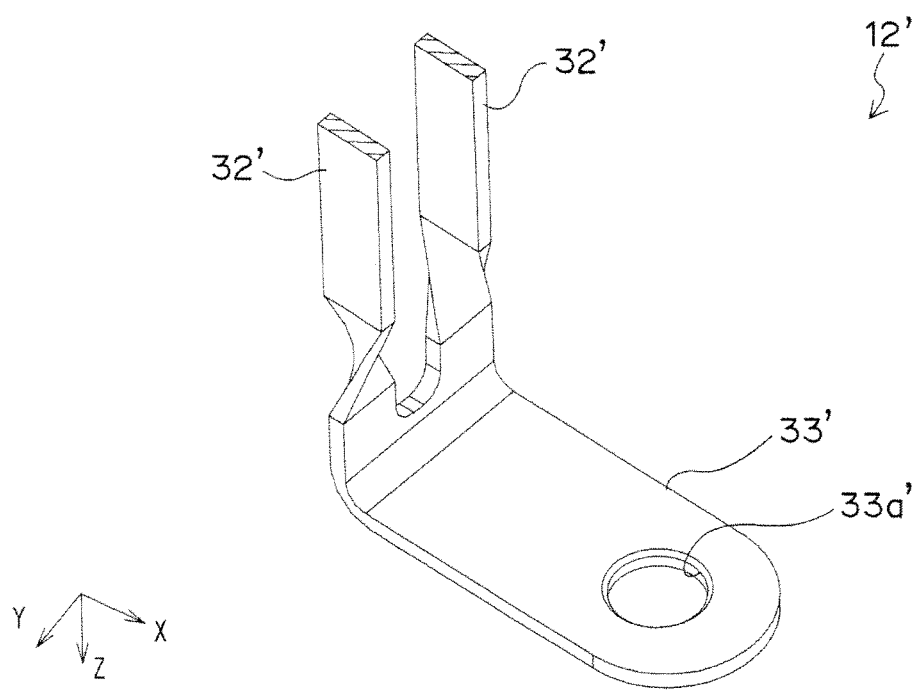
FIG. 9 is a partly enlarged perspective view of a negative current collector laid upside down in a comparative example.

The present invention is not limited to the above-described embodiment, and therefore, it may be variously modified. Alternatively, like the comparative examples shown in FIG. 9, even when a rib similar to the rib 37 may be disposed at the outer peripheral edge of the merely flat base which is not stepwise structured, the strength of the base of the current collector can be increased, so that the vibration resistance and the shock resistance can be enhanced. Moreover, although the present invention has been described by way of the nonaqueous electrolytic secondary battery, the present invention is applicable to batteries other than the nonaqueous electrolytic secondary battery.

What is claimed is:

1. A battery including a current collector which electrically connects a power generating element contained inside of an envelope to an external terminal with at least a part disposed outside of the envelope,
   wherein the current collector comprises:
      a base electrically connected to the external terminal;
      a connector projecting from the base to be electrically connected to the power generating element; and
      a rib disposed in the base, and
   wherein the rib is positioned above a tip of the connector.

2. The battery according to claim 1, wherein the rib is disposed along at least a part of an outer peripheral edge of the base.

3. The battery according to claim 1, wherein the rib is formed by drawing the base.

4. The battery according to claim 1, wherein the rib includes a main portion projecting from the base in the same orientation as that of the connector.

5. The battery according to claim 4, wherein the rib further includes an extension projecting from the tip end of the main portion.

6. The battery according to claim 1, wherein the envelope includes a cover comprising a recess formed at the inside surface thereof, and
wherein the base of the current collector is disposed in the recess.

7. The battery according to claim 1, wherein the envelope includes a cover comprising a recess formed at the inside surface thereof, and
wherein the base of the current collector includes:
a first portion contained inside of the recess;
a second portion contained in the inside surface of the cover adjacent to the recess and comprising the connector; and
a joint which stepwise joins the first portion and the second portion to each other.

8. The battery according to claim 4, wherein the envelope includes a cover comprising a recess formed at the inside surface thereof, and
wherein the base of the current collector includes:
a first portion contained inside of the recess;
a second portion contained in the inside surface of the cover adjacent to the recess and comprising the connector; and
a joint which stepwise joins the first portion and the second portion to each other,
the main portion of the rib being disposed at the outer peripheral edge of the first portion in the base except a portion joined to the joint.

9. The battery according to claim 8, wherein the rib further includes an extension projecting from the tip end of the main portion, and the connector is connected to the extension of the rib.

10. The battery according to claim 9, wherein the main portion of the rib is further disposed at the second portion of the base, and
wherein the extension of the rib is disposed at the second portion side of the first portion and the second portion in the base.

11. A current collector which electrically connects a power generating element contained inside of an envelope of a battery and an external terminal whose at least part is disposed outside of the envelope, the current collector comprising:
a base to be connected to the external terminal;
a connector projecting from the base to be connected to the power generating element; and
a rib disposed in the base, and
wherein the rib is positioned above a tip of the connector.

12. The battery according to claim 1, wherein the rib is an integral part of the current collector,
wherein the rib is electrically connected to the power generating element, and
wherein the base is caulked to be joined to the envelope.

13. The current collector according to claim 11, wherein the rib is an integral part of the current collector,
wherein the rib is electrically connected to the power generating element, and
wherein the base is caulked to be joined to the envelope.

14. The current collector according to claim 11, wherein the rib protrudes from the base in a same direction that the connector projects from the base.

15. The battery according to claim 1, wherein the rib protrudes from the base in a same direction that the connector projects from the base.

16. The battery according to claim 1, wherein the rib projects from base with a distance less than a distance that the connector projects from the base.

17. The battery according to claim 1, wherein the connector is in physical contact with the power generating element, and the rib is not in physical contact with the power generating element.

18. The battery according to claim 1, wherein the rib is formed above a top surface of the power generating element.

19. The battery according to claim 1, wherein the battery comprises a prismatic battery.

20. The battery according to claim 1, wherein the connector projects along a side surface of an electrode of the power generating element.

* * * * *